United States Patent Office 3,069,967
Patented Dec. 25, 1962

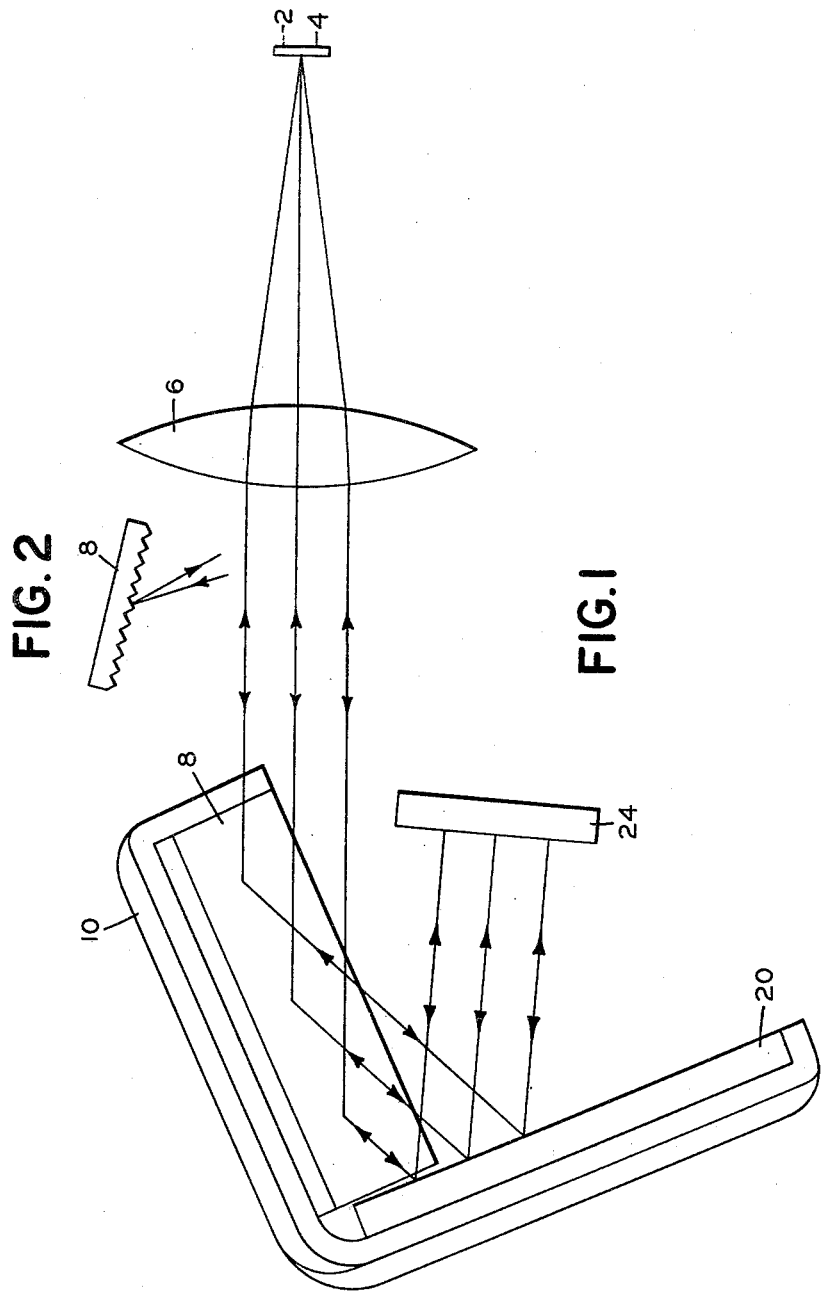

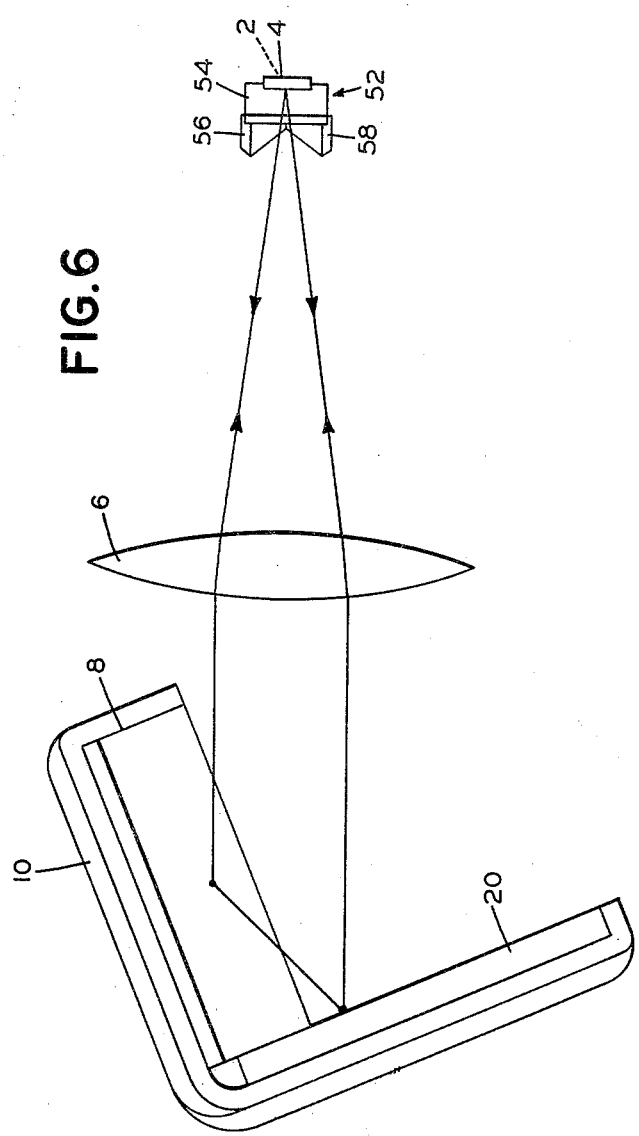

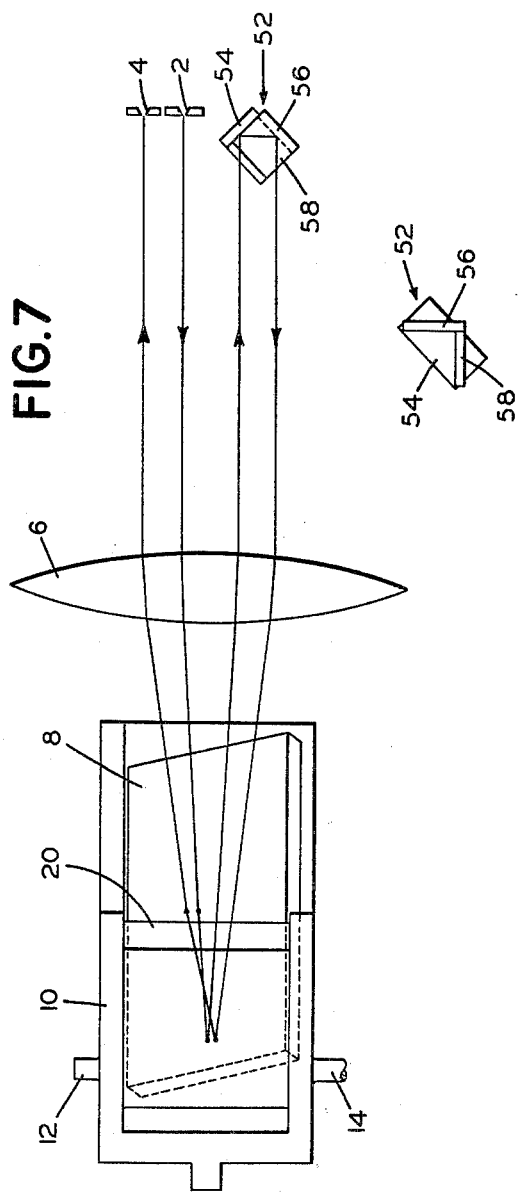

3,069,967
APPARATUS EMPLOYING STATIONARY OPTICAL MEANS AND DIFFRACTION GRATING
John U. White, Darien, Conn. (% The White Development Corp., 80 Lincoln Ave., Stamford, Conn.), and Henry H. Cary, Pasadena, Calif. (Applied Physics Corp., 2724 S. Peck Road, Monrovia, Calif.)
Filed Dec. 7, 1959, Ser. No. 857,978
11 Claims. (Cl. 88—14)

This invention relates to spectroscopy and, more particularly, to monochromators employing a diffraction grating.

In monochromators for selectively isolating portions of a spectrum it is often desirable that the apparatus operate over a wide range of wave-lengths with maximum intensity and resolution and with minimum adjustment in or alterations to the apparatus.

Some monochromators have heretofore employed a diffraction grating, but have employed a given grating continuously in only a relatively narrow range of wave lengths. Where a wider range of wave length was desired, various proposals for obtaining such increases in range have heretofore been accompanied by various disadvantages, such as loss of intensity or resolution, or rotation of the image at the exit slit, or the necessity of using in the monochromator first one grating for one portion of the range and then other gratings for other portions of the range.

In copending application Serial No. 857,925, filed December 7, 1959, by John U. White, there is proposed a monochromator employing a single diffraction grating which is operable over a wide range of wave lengths without sacrifice in intensity and resolution and, in which, among other advantages, the image orientation at the exit slit remains fixed throughout the monochromator's range of operation.

In the apparatus of the copending application, there is provided a monochromator employing as its dispersing element a diffraction grating, oriented with respect to the other components of the system and to the radiation path so that, throughout the operation of the apparatus, the grating is used at such a position as to provide maximum radiation intensity. Associated with the grating there are provided apparatus for directing radiation onto the grating, a reflector means for receiving diffracted radiation from the grating, the reflector means being positioned and arranged to return the diffracted radiation back to the grating for a second diffraction, and apparatus for receiving the twice diffracted radiation from the grating. As the grating of the copending application is rotated, radiation is directed from a source, through an entrance slit, onto the grating for a first diffraction, thence from the grating to the reflector means and back to the grating for a second diffraction and, from the grating, the twice diffracted radiation is directed to an exit slit.

In the embodiment illustrated in the copending application, as the grating is rotated, the reflector means is also rotated but in order to maintain the reflector means in proper orientation with the diffraction radiation received from the grating so that such diffracted radiation will be returned to the grating for a second diffraction and, thence to the exit slit, the angle through which the reflector means must be rotated is of a different magnitude than the angle through which the grating is rotated. This difference in angular magnitude in the rotation of the grating and reflector means requires precision mechanical components which must be accurately machined and maintained.

One object of this invention is to provide an improved monochromator employing a single diffraction grating and operable over a wide range of wave lengths while reducing the complexity of the mechanical components.

It is a further object of the invention to provide such a monochromator which is operable over a wide range of wave lengths with a simple mechanism to rotate the grating and reflector means. These and other objects will become more apparent from the following description and attached drawings of illustrative embodiments, in which:

FIG. 1 is a plan view of an embodiment of the invention using a lens as a collimator;

FIG. 2 is an end view of the preferred type of grating;

FIG. 6 is a plan view of a further embodiment of the invention;

FIG. 7 is an elevation view of the embodiment of FIG. 6; and

FIG. 8 is an end view of the corner cube mirror of FIG. 6, the view being taken from the end of two of the mirrors and perpendicular to the third mirror.

Figure 3:
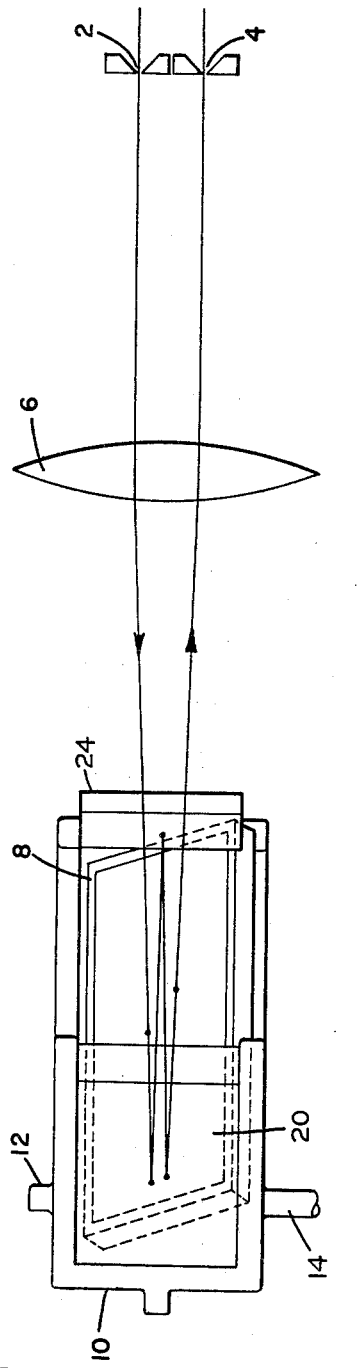
FIG. 3 is an elevation view of the embodiment of FIG. 1.

In the apparatus described herein, there is provided a monochromator employing as its dispersing element a diffraction grating, oriented with respect to the other components of the system and to the radiation path so that, throughout the operation of the apparatus, the grating is used at such a position as to provide maximum radiation intensity. Associated with the grating there are provided apparatus for directing radiation onto the grating, a first flat mirror rotatable with the grating and a reflector means mounted in a fixed stationary position, the flat mirror and reflector means being positioned with respect to each other and to the other components of the system so as to receive diffracted radiation from the grating and to return such diffracted radiation back to the grating for a second diffraction, and apparatus for receiving the twice diffracted radiation from the grating. Thus, in one embodiment of the invention, radiation from an entrance slit is directed to a grating for a first diffraction, thence from the grating to a first flat mirror, from the first flat mirror to a second flat mirror, from the second mirror back to the first mirror thence to the grating for a second diffraction, and, from the grating, the twice diffracted radiation is directed to a point of discharge, typically an exit slit.

Between the entrance slit and the grating, a collimator, which may be in the form of a lens, a concave mirror, or the like, is positioned to receive radiation from the entrance slit and to collimate and direct the radiation to the grating. Similarly, a collimator is positioned between the grating and the exit slit to receive the radiation after diffraction by the grating and to focus the diffracted radiation on the exit slit. It is preferred to position the entrance and exit slits so that a single collimator can be employed to direct the radiation from the entrance slit to the grating and from the grating to the exit slit.

In the apparatus, it is preferred that the grating be of the blazed type. The grating is mounted with respect to the other components of the system in the same manner as is shown and described in the aforementioned copending application. In such mounting, the grating is mounted with respect to the other components of the system so that the direction of the blaze of the grating lies in the plane of the incident radiation and so that the used part of the radiation diffracted by the grating lies in the plane of its blaze. Thus, solely by way of example, assuming that the entrance slit is horizontal and that the plane of the incident radiation and the used part of the diffracted radiation are also horizontal, the grating may then, in such illustrative embodiment, be mounted for rotation about a vertical axis, the grating being oriented so that its rulings are horizontal and remain horizontal as the grating rotates. The grating is so mounted that it is tilted at a fixed angle with respect to the plane of the incident radiation and the used part of the diffracted radiation, the angle being so chosen that the grating is always oriented in the system to provide maximum radiation intensity. This would be accomplished, in the illustration here under consideration, by maintaining the blazed grating tilted at such an angle that the direction of its blaze is in a horizontal plane, and remains in that plane as the grating rotates. After diffraction by the grating, the used part of the diffracted radiation is reflected by a first flat mirror, fixed in a vertical position and mounted for rotation with the grating, to a reflector means fixed in a stationary vertical position and, from the reflector means the diffracted radiation is reflected back to the first mirror and thence to the grating for a second diffraction and, from the grating, is directed to the exit slit. Thus, in operation of the apparatus for a wide range of wave lengths, as the grating and first flat mirror are rotated, maximum radiation intensity is provided at the exit slit.

Referring now to the drawings, particularly FIGS. 1 and 3, there is shown an entrance slit 2, an exit slit 4, coplanar and in vertical alignment with the entrance slit 2, a grating 8 and a lens 6 positioned intermediate the entrance and exit slits 2, 4 and grating 8. Grating 8 is tilted on mounting 10 which is supported at 12, 14 for rotation about a vertical axis. A first flat mirror 20 is fixed to the mounting 10 and rotates with grating 8 as the mounting 10 is rotated. A second flat mirror 24 is fixed in a stationary position with respect to the other components of the apparatus with its reflecting surface essentially normal to the radiation received from mirror 20. In the arrangement illustrated in the drawings, the grooves or rulings of the grating run horizontally, that is, parallel to the plane of the paper in FIG. 1. In this figure, the mirrors 20 and 24 are perpendicular to the plane of the paper.

As best shown in FIG. 3, th entrance slit 2 is offset slightly above the axis of the lens 6, and the exit slit 4 is offset slightly below that axis. As shown in this figure, as the radiation progresses along its path, from the lens through the remainder of the apparatus back to the lens, the axial path of the radiation plunges downwardly slightly. In the interest of clarity and brevity in the description, repeated reference to this plunging action will be avoided, but it will be understod that one or more of the components of the apparatus is adjusted in position slightly to take this into account. That is, where the positions of various components are specified, it will be understood, although not mentioned with any particular use, the positions may be adjusted slightly on account of the plunging action.

While, as in the aforementioned copending application, any type of grating may be used in the apparatus, a blazed type of grating, such as that shown in view in FIG. 2, is preferred. As shown in FIG. 2, a blazed grating is ruled with parallel grooves of predetermined shape so that at least one side of the groove is flat, the direction normal to the flat side being referred to as the blaze. Thus, the blazed grating 8 provides a series of parallel plane surfaces 11 arranged angularly in steps on the face of the grating. In the particular grating illustrated in FIG. 2, the rulings have been formed so that the angle between a line normal to the grating and a line normal to the faces 11 of the grooves is 35°. In the apparatus shown in plan view in FIG. 1, where the plane of the paper may be regarded as a horizontal plane, the grating is tilted backward at an angle of approximately 35° from the vertical. In other words, to provide maximum intensity from the grating illustrated, the grating is tilted backward (about an axis parallel to the rulings of the grating) to an angle of approximately 35° with the plane of the incident and the used part of the diffracted radiation. With the grating thus positioned, the direction of the blaze of the grating lies in the plane of the incident radiation, and the used part of the diffracted radiation lies in the plane of the blaze of the grating. Other degrees of tilting would be required for gratings blazed at other angles.

With the grating tilted as described, in the embodiment illustrated the individual surfaces 11 of the grating are vertical and the flat mirrors 20 and 24 are also vertical.

The entrance and exit slits 2, 4, the lens 6 and the mirror 24, in the apparatus, are fixed in a stationary position and the grating 8 and flat mirror 20 are rotatable about a vertical axis, that is, about an axis perpendicular to the direction of the grating rulings and perpendicular to the plane of the incident and the used portion of the diffracted radiation. As best shown in FIGS. 1 and 3, the grating 8 is fixed, in its tilted position, to a mounting 10, and flat mirror 20 is fixed in a vertical position to mounting 10, the reflecting face of mirror 20 being at an angle near 90° with the rulings of the grating 8. The mounting 10 is rotatably supported at 12 and 14. Any suitable means may be employed for rotating the mounting 10. To scan the spectrum the mounting 10, with the grating 8 and flat mirror 20, is rotated.

As shown, radiation enters the monochromator through the entrance slit 2 and after passing through the collimating lens 6 is diffracted by the grating 8 to the first flat mirror 20 and, from the flat mirror 20 the diffracted radiation is reflected to the mirror 24 and, from the mirror 24 back to the mirror 20 and the grating 10 for a second diffraction and, after a second diffraction by the grating 8, the radiation passes through lens 6 to exit slit 4. As grating 8 and mirror 20 are rotated to successive different positions, radiation of different wave lengths emerges through the exit slit.

As in the apparatus of the aforementioned copending application, it will be noted that in the embodiment of the apparatus described above, the arrangement is in marked contrast to arrangements in which radiation is directed onto a grating along a direction which is perpendicular to the direction of the rulings of the grating. Thus, in FIG. 1, it may be seen that the direction of the radiation incident on the grating is not perpendicular to the direction of the rulings, but instead is inclined to the direction of the rulings at a variable oblique angle.

In the embodiment shown in FIG. 3, the grating 8 and mirror 10 are rotated as a unit and the mirror 20 is maintained stationary, the mirrors 20 and 24 being oriented in such a manner that diffracted radiation will be reflected by the mirror 20 to the stationary mirror 24 and, from the stationary mirror 24 the diffracted radiation will be reflected back to the mirror 20 and, from the mirror 20, to the grating 8 for a second diffraction and, thence, to the exit slit. It will be noted, as illustrated in FIG. 1, that as the grating and the mirror are rotated from a first position to a second position, a given used portion of the diffracted radiation which travels from the grating to the rotatable mirror and, thence, to the stationary mirror, along a certain path is returned by the stationary mirror and the rotatable mirror to the grating along substantially the same path. There is, however, some plunging action, as may be seen in FIG. 3, the amount of plunging being different for different points along the length of the slit. This results in some vignetting of the aperture of the system with consequent loss of radiant energy.

Figure 5:
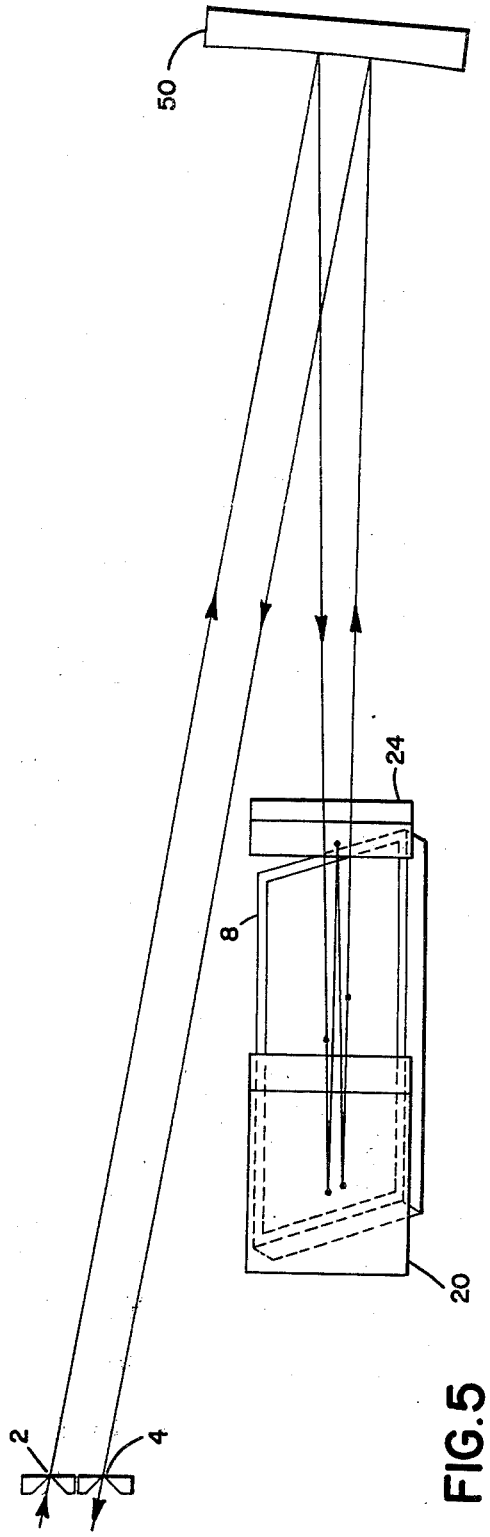
FIG. 5 is an elevation view of the embodiment of FIG. 4.
Figure 4:
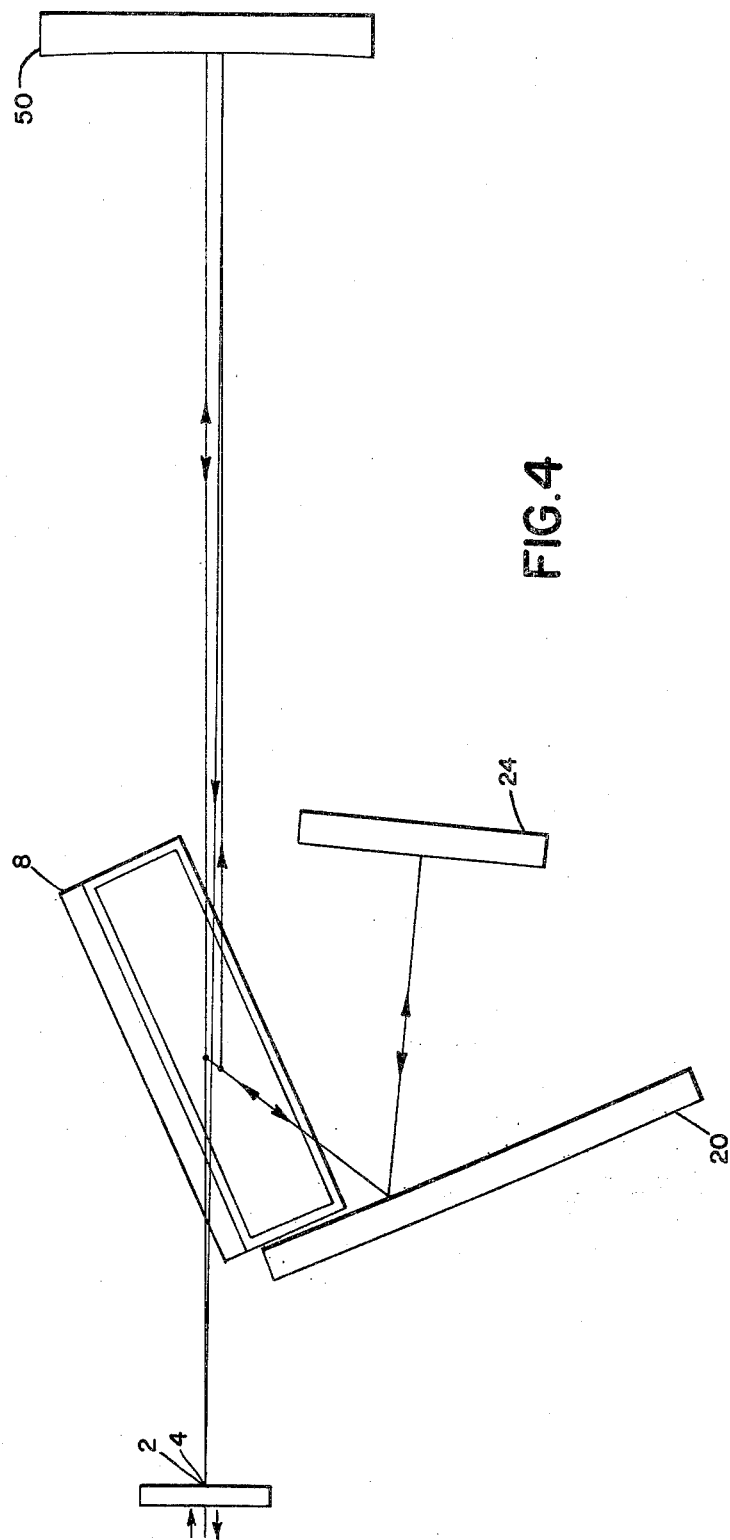
FIG. 4 is a plan view of a device similar to the device of FIG. 1 showing a concave mirror as the collimator.

Another embodiment of the apparatus is shown in FIGS. 4 and 5. Here the lens 6 of the previous embodiment has been replaced with a concave mirror 50, and the entrance and exit slits 2, 4 have been relocated. The device of FIGS. 4 and 5 operates in the same manner as that shown in FIGS. 1, 2 and 3, the concave mirror being employed as the collimator for use in those spectral regions where mirrors are better than lenses. Still other collimators may be substituted for those which have been described.

Referring now to FIGS. 6, 7 and 8, there is shown a modified reflector system for reflecting the used part of the diffracted radiation and returning such radiation to the grating for a second deffraction. In this modification of the apparatus, the flat mirror 24 of the previous embodiments has been replaced with corner cube mirror or reflector generally indicated as 52. In this embodiment the lens 6 is larger than that employed in the embodiments of FIGS. 1 through 3, the radiation passing through the lens four times, once in its path from the entrance slit to the grating, a second time in its path to the corner cube reflector, a third time in its path back to the grating and, finally, in its path from the grating to the exit slit. The mirror 20 may be exactly normal to the rulings of the grating 8, in which case the reflections of said rulings in said mirror lie accurately along the same lines as the rulings themselves, and the said reflections act optically to double the effective length of the rulings.

The corner cube mirror or reflector 52 is formed by three mirrors 54, 56, 58, each mirror being positioned perpendicular to the other two mirrors to form a rectangular corner, the reflecting surfaces of the respective mirrors facing inwardly into the corner. Thus, the mirrors 54, 56, 58 form three reflection surfaces each perpendicular to the other two. When this reflection system is employed, the corner cube reflector 52 is mounted in a fixed tilted position in such a manner that the three reflecting or mirror surfaces are approximately equiangular with the path of diffracted radiation received from grating 8. In the apparatus of this embodiment, a part of the radiation from the entrance slit 2 is directed by lens 6 to grating 8, thence from the grating to flat mirror 20 and, from the flat mirror, through lens 6 to corner cube reflector 52, where the used portion of the diffracted radiation is reflected three times, once by each mirror, and, from the corner cube reflector, the used portion of the diffracted radiation is returned back through lens 6 to mirror 20, grating 8, lens 6 and to exit slit 4. The other part of the radiation from the entrance slit 2 is directed by lens 6 to the flat mirror 20, thence from the flat mirror to the grating 8 and from the grating through lens 6 to corner cube reflector 52, where the used portion of the diffracted radiation is reflected three times, once by each mirror, and, from the corner cube reflector, the used portion of the diffracted radiation is returned back through lens 6 to the grating 8, mirror 20, lens 6 and to exit slit 4.

In the apparatus of the invention, it will be noted that reflector means are mounted with respect to the grating to receive diffracted radiation from the grating and to reflect such diffracted radiation back to the grating. It is to be understood that reflection apparatus other than as shown in the attached drawings may be employed so long as the net effect is to cause the same inversion of the radiation.

One way of describing the correct arrangement and operation is to say that the radiation returning to the grating for a second diffraction is similar to a mirror image of that leaving the grating after the first diffraction. Thus, as seen by the grating, the net effect is that the beam of radiation is inverted in a manner some times referred to as right for left (as is done for example by a single mirror), but at the time of its return to the grating it is not inverted top for bottom. That is, radiation that was diffracted from one end of the grating the first time must be returned to the same end for the second diffraction, and radiation that was diffracted from one edge of the grating the first time must be returned to the same edge for the second diffraction.

The path of the radiation, from the time it leaves the grating after a first diffraction until it is returned to the grating for a second diffraction, may include various numbers of reflections from plane mirrors. Thus, in the apparatus shown in FIGS. 1, 3, 4 and 5, the diffracted radiation is reflected three times before it is returned to the grating, while in the apparatus of FIG. 6, the diffracted radiation is reflected five times, twice by the flat mirror 20 and once each by the mirrors 54, 56 and 58, respectively. However, for purposes of the invention, the diffracted radiation could be reflected additional times from plane mirrors, and also focused into intermediate images provided that on its return to the grating the radiation is inverted in the same manner as if it had been reflected directly back by a single plane mirror. The method of accomplishing the desired inversion described above may be by means of mirrors, lenses, prisms or combinations of them.

In certain cases, where the apparatus is being employed to sense diffracted radiation of a given wave length of a certain order, there may be paths by which radiation of a different wave length, and of a different order, might reach the exit slit, if provision were not made to prevent this. This may be prevented by limiting the free spectral range, as, for example, by the use of a fore-prism, prior to the entrance slit, capable of excluding wave lengths which might produce such effects. Alternatively, appropriate filtering may be employed. Still another way of reducing this effect is by proper proportioning of the height of the grating to the height of the mirror. In other words, the height of the grating is limited in the direction across the rulings so that undesired radiation will not strike the grating upon return from the mirror and, with the desired radiation, return to the exit slit. If desired, the radiation may be passed through a supplemental monochromator before its introduction into the entrance slit of the apparatus of the invention or following the exit slit thereof.

In the case of the embodiment of the invention illustrated in FIGS. 6, 7 and 8, there is a possibility that some radiation will pass from the entrance slit 2 through the lens 6 to the grating 8 and then be diffracted out of the direction of the blaze of the grating and into a new direction such that after reflection from mirror 20 it travels directly toward exit slit 4. The wavelength of radiation that emerges from the exit slit 4 after having by-passed the corner cube reflector 52 and the second diffraction is different from that of the normal, doubly diffracted radiation. Such radiation of different wavelength may be eliminated from the emerging beam by restricting the height of the beam entering the entrance slit to half the length of the entrance slit and utilizing only that radiation which emerges from the opposite half of the exit slit.

The effects of radiation of different wavelength may also be eliminated in certain cases by modifying the radiation that passes through the corner cube reflector and is subsequently diffracted a second time by the grating, in such a way as to make it distinguishable from the radiation of different wavelength. Modification of the radiation may be accomplished by interrupting the radiation periodically between the first and second diffractions, in the vicinity of the corner reflector, and observing the light emerging from the exit slit by means of a detecting instrument that is selectively sensitive to interrupted or pulsating light but not to steady light. Another modification that may be used employs polarized light in which the monochromator is placed between two polarizing devices so oriented that light will not ordinarily pass through the system of polarizers and monochromator. A material that rotates the plane of polarized light 90° is placed in front of the corner reflector, causing the polarization of the light that passes through it to be so oriented that it is transmitted by the second polarizing device. Thus only that part of the radiation that has passed through the corner reflector can emerge from the total system.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. In a monochromator, in combination, a dispersing element comprising a diffraction grating, means forming an entrance slit, means forming an exit slit, a first reflecting means, a second reflecting means, means for directing radiation entering said monochromator through said entrance slit along a path to said grating, thence to said first reflecting means, to said second reflecting means, thence back to said first reflecting means, to said grating for a second diffraction, and to said exit slit, and means for rotating said grating about an axis substantially perpendicular to the direction of the rulings of said grating.

2. In a monochromator, in combination, means forming an entrance slit, means forming an exit slit, a diffraction grating, optical means positioned to receive diffracted radiation from said grating, said optical means including a first mirror and a second mirror, means for directing radiation along a path from said entrance slit to said grating for a first diffraction, thence to said first mirror, to said second mirror, back to said first mirror, thence back to said grating for a second diffraction, and thence to said exit slit, and means for rotating said grating and said first mirror about an axis perpendicular to the direction of the rulings of said grating, said axis being also substantially perpendicular to the plane of the radiation incident on said grating from said entrance slit.

3. In a monochromator, in combination, means forming an entrance slit, means forming an exit slit, a diffraction grating having rulings, optical means including a first mirror and a second mirror, said first mirror being positioned to receive diffracted radiation from said grating, means for directing radiation along a path from said entrance slit to said grating for a first diffraction, thence to said first mirror, to said second mirror, back to said first mirror, thence back to said grating for a second diffraction, and thence to said exit slit, whereby the used component of said diffracted radiation emerges from said exit slit, means for rotating said grating and said first mirror about an axis perpendicular to the direction of the rulings of said grating, said axis being also substantially perpendicular to the direction of the radiation incident on said grating from said entrance slit, said grating, throughout its said rotation, being positioned to direct the used component of said diffracted radiation along said path with maximum intensity.

4. Apparatus according to claim 3 in which said grating is of the blazed type, said grating being maintained, throughout its rotation, tilted at such an angle that the radiation incident on the grating, the used part of the diffracted radiation, and the direction of the blaze of the grating, all lie in the same plane.

5. In a monochromator, in combination, means forming an entrance slit, means forming an exit slit, a reflection-type diffraction grating having rulings, reflecting means, means for directing radiation along a path from said entrance split to said grating for a first diffraction, thence to said reflecting means, thence back to said grating for a second diffraction and thence to said exit slit, and scanning means for rotating said grating about an axis perpendicular to the direction of said rulings, said reflecting means including a mirror mounted for rotation about said axis along with, and at the same rate as, said grating.

6. Apparatus according to claim 5, in which said reflecting means includes a stationary mirror positioned in relation to said grating and said rotatable mirror so that diffracted radiation from said grating is directed along a path to said rotatable mirror, thence to said stationary mirror, back to said rotatable mirror, and thence to said grating for said second diffraction.

7. In a monochromator, in combination, a dispersing element comprising a diffraction grating having blazed rulings on its face, an entrance slit, an exit slit, collimating means for directing radiation along a path from said entrance slit to said grating and from said grating to said exit slit, a first plane mirror for receiving diffracted radiation from said grating, a second plane mirror for receiving diffracted radiation from said first mirror and for returning said diffracted radiation to said first mirror and, from said first mirror, to said grating for a second diffraction, and a mounting for said grating and said first plane mirror for rotating said grating and said first plane mirror about an axis perpendicular to the direction of the rulings on said grating, said first plane mirror being positioned on said mounting with its face substantially perpendicular to the direction of said rulings on said grating.

8. In a monochromator, in combination, means forming an entrance slit, means forming an exit slit, a diffraction grating having rulings, optical means including reflecting means, means for directing radiation along a path from said entrance slit to said grating for a first diffraction, thence to said optical means, thence back to said grating for a second diffraction and thence to said exit slit, said rulings running in directions parallel to the plane of the radiation incident on said grating from said entrance slit, said grating being positioned so that said radiation incident on it from said entrance slit strikes it at angles other than perpendicular to the direction of its rulings, means for rotating said grating about an axis perpendicular to said rulings, said optical means including at least one stationary mirror, and means for receiving a portion of the diffracted radiation from said grating and for directing it onto said stationary mirror, whereby said portion of said diffracted radiation is returned to said grating for said second diffraction.

9. In a monochromator, in combination, means forming an entrance slit, means forming an exit slit, a diffraction grating having rulings, optical means including reflecting means, means for directing radiation along a path from said entrance slit to said grating for a first diffraction, thence to said optical means, thence back to said grating for a second diffraction and thence to said exit slit, said rulings running in directions parallel to the plane of the radiation incident on said grating from said entrance slit, said grating being positioned so that said radiation incident on it from said entrance slit strikes it at angles other than perpendicular to the direction of its rulings, means for rotating said grating about an axis perpendicular to said rulings, said optical means including a corner cube reflector mounted in a fixed position, and means for receiving a portion of the diffracted radiation from said grating and for directing said diffracted radiation onto said corner cube reflector, whereby said portion of said diffracted radiation is returned to said grating for said second diffraction.

10. In a monochromator, in combination, a dispersing element comprising a diffraction grating, means forming an entrance slit, means forming an exit slit, a mirror, a corner cube reflector, means for rotating said grating and said mirror about an axis perpendicular to the rulings on said grating and means for directing radiation entering said monochromator through said entrance slit along a path to said grating, thence to said mirror, to said corner cube reflector and, from said corner cube reflector, back to said mirror, to said grating for a second diffraction, and to said exit slit.

11. In a monochromator, in combination, a dispersing element comprising a diffraction grating, means for rotating said grating about an axis substantially perpendicular to the rulings on said grating, means forming an entrance slit, means forming an exit slit, a mirror, a corner cube reflector, a collimator positioned between said entrance slit, said exit slit and said diffraction grating, said collimating means also being positioned between said mirror and said corner cube reflector whereby radiation entering said monochromator through said entrance slit passes through said collimator to said grating for a first diffraction, thence to said mirror, through said collimating means to said corner cube reflector and from said corner cube reflector back through said collimating means to said mirror and to said grating for a second diffraction, said second diffracted radiation passing through said collimator to said exit slit.

References Cited in the file of this patent

UNITED STATES PATENTS

| 2,856,531 | Brouwer | Oct. 14, 1958 |
| 2,922,331 | Fastie et al. | Jan. 26, 1960 |
| 2,945,953 | Martin | July 19, 1960 |

OTHER REFERENCES

Bausch and Lomb catalog: "Diffraction Gratings," pp. 7 and 8 cited.